United States Patent
Cai et al.

(10) Patent No.: US 11,952,307 B2
(45) Date of Patent: Apr. 9, 2024

(54) METHOD FOR PREPARING MICROSTRUCTURE ON SURFACE OF GLASS BY TITANIUM OXIDE NANOPARTICLE-ASSISTED INFRARED NANOSECOND LASER

(71) Applicant: SHANDONG UNIVERSITY, Shandong (CN)

(72) Inventors: Yukui Cai, Jinan (CN); Zhanqiang Liu, Jinan (CN); Xichun Luo, Jinan (CN); Yiping Tang, Jinan (CN); Yi Wan, Jinan (CN); Qinghua Song, Jinan (CN); Bing Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 724 days.

(21) Appl. No.: 17/255,145

(22) PCT Filed: Dec. 28, 2019

(86) PCT No.: PCT/CN2019/129537
§ 371 (c)(1),
(2) Date: Dec. 22, 2020

(87) PCT Pub. No.: WO2021/082261
PCT Pub. Date: May 6, 2021

(65) Prior Publication Data
US 2021/0371329 A1    Dec. 2, 2021

(30) Foreign Application Priority Data
Oct. 31, 2019   (CN) .......................... 201911055343.7

(51) Int. Cl.
*C03C 17/25*      (2006.01)
*C03C 23/00*      (2006.01)
*B82Y 40/00*      (2011.01)

(52) U.S. Cl.
CPC ........ *C03C 17/256* (2013.01); *C03C 23/0025* (2013.01); *C03C 23/0075* (2013.01);
(Continued)

(58) Field of Classification Search
CPC .............. C03C 17/2456; C03C 17/256; C03C 23/0075; C03C 23/0025; B23K 26/70
See application file for complete search history.

(56) References Cited

U.S. PATENT DOCUMENTS

2003/0199383 A1*  10/2003  Ishioka ................... C03C 3/118
                                                                501/65
2009/0261082 A1*  10/2009  Wagner ................... C03C 15/00
                                                                219/121.68

FOREIGN PATENT DOCUMENTS

CN          1997606 A      7/2007
CN        102888598 A      1/2013
(Continued)

OTHER PUBLICATIONS

Jul. 31, 2020 International Search Report issued in International Patent Application No. PCT/CN2019/129537.
(Continued)

*Primary Examiner* — Joseph A Miller, Jr.
(74) *Attorney, Agent, or Firm* — Oliff PLC

(57) ABSTRACT

A method for preparing a microstructure on the surface of glass by titanium oxide nanoparticle-assisted infrared nanosecond laser, including the following steps: (1) dropwise applying a titanium oxide nanoparticle hydrogel onto the surface of a glass sample; (2) pressing another piece of glass on the surface of the hydrogel, so the hydrogel is evenly distributed between the two pieces of glass, and allowing the two pieces of glass to stand horizontally for a period of time to air-dry the hydrogel; (3) separating the two pieces of glass to obtain a glass with a uniform titanium oxide nanoparticle coating; (4) forming a microstructure using an infrared
(Continued)

nanosecond laser with a wavelength of 1064 nm; and (5) performing after-treatment, including ultrasonically cleaning the sample with acetone, absolute ethanol and deionized water respectively for 10 min to remove titanium oxide nanoparticles attached to the surface, to obtain a glass sample with the microstructure.

3 Claims, 2 Drawing Sheets

(52) U.S. Cl.
CPC ......... *B82Y 40/00* (2013.01); *C03C 2217/212* (2013.01); *C03C 2218/11* (2013.01); *C03C 2218/32* (2013.01)

(56) References Cited

FOREIGN PATENT DOCUMENTS

| | | |
|---|---|---|
| CN | 105377783 A | 3/2016 |
| CN | 107382044 A | 11/2017 |
| CN | 109809701 A | 5/2019 |
| DE | 20023710 U1 | 2/2006 |

OTHER PUBLICATIONS

Jul. 31, 2020 Written Opinion of the International Searching Authority issued in International Patent Application No. PCT/CN2019/129537.

\* cited by examiner

//METHOD FOR PREPARING MICROSTRUCTURE ON SURFACE OF GLASS BY TITANIUM OXIDE NANOPARTICLE-ASSISTED INFRARED NANOSECOND LASER

BACKGROUND

Technical Field

The present invention belongs to the technical field of laser machining, and discloses a method for preparing a microstructure on the surface of glass by infrared nanosecond laser.

Related Art

Information disclosed in the related art section is merely for better understanding of the overall background of the present invention, and should not be taken as an acknowledgement or any suggestion that the information constitutes the prior art that is well known to those of ordinary skill in the art.

Quartz glass has excellent physical and chemical properties and is widely used in biomedicine, aerospace and other fields. For example, microfluidic chips made of quartz glass have the advantages of good light transmittance, good chemical stability and good biological compatibility. However, due to high hardness and brittleness and low fracture toughness of glass, there are always problems in the fabrication of micropores and microfluidic channels on the glass surface. Traditional abrasive jet processing is suitable for glass cutting, but is difficult to apply to the fabrication of microstructures on the glass surface. The fabrication of microstructures on the glass by chemical etching has the defects of chemical pollution and low processing efficiency. As a non-contact processing method, laser processing has the advantages of simple process, low pollution, direct patterning without the need of masks, etc. At present, in glass processing, a 10.6 μm $CO_2$ laser is often used for glass cutting, or uses an excimer laser for drilling and microstructure processing. However, the average power of excimer lasers is low, resulting in low processing efficiency and high cost. Infrared nanosecond laser is one of the most widely used laser types. However, quartz glass is a very good infrared-transmitting material and has a very low absorption rate for 1064 nm infrared nanosecond laser, and material removal cannot be realized.

SUMMARY

In order to overcome the above problems, the present invention provides a method for preparing a microstructure on the surface of glass by titanium oxide nanoparticle-assisted infrared nanosecond laser. In view of the characteristic that quartz glass cannot absorb infrared nanosecond laser, the present invention increases the absorption rate of infrared nanosecond laser at the interface between glass and a titanium oxide nanoparticle coating by coating the titanium oxide nanoparticles, thereby realizing fabrication of a microstructure. The present invention solves the problem that the quartz glass has a low absorption rate for 1064 nm infrared nanosecond laser and cannot be processed.

In order to achieve the above technical objectives, the technical solutions adopted by the present invention are as follows:

A method for preparing a microstructure on the surface of glass by titanium oxide nanoparticle-assisted infrared nanosecond laser, includes the following steps:
  dropwise applying a titanium oxide nanoparticle hydrogel onto the surface of a glass sample;
  then pressing another piece of glass on the surface of the titanium oxide nanoparticle hydrogel, so that the titanium oxide nanoparticle hydrogel is evenly distributed between the two pieces of glass, and allowing the two pieces of glass to stand horizontally until the titanium oxide nanoparticle hydrogel is solidified;
  separating the two pieces of glass to obtain a glass with a uniform titanium oxide nanoparticle coating;
  forming a microstructure using laser; and
  performing after-treatment to obtain a glass sample with the microstructure.

Research of the present application found that: the hydrogel has certain viscosity, and cannot be spread out completely when dropwise applied to the glass surface; the pressure of another piece of glass can be used to achieve uniform coating, and two pieces of glass can be coated at a time. Through experiments, the uniformity of the entire glass surface is difficult to ensure by other coating methods.

In some embodiments, the glass is quartz glass. By increasing the absorption rate of the infrared nanosecond laser at the interface between the titanium oxide nanoparticle coating and a glass substrate, high-efficiency and low-cost fabrication of microstructures is realized.

In some embodiments, the laser is infrared nanosecond laser. At present, short-wavelength lasers (for example, 532 nm) can be directly used to process glass without coating. However, the laser cost is relatively high. Infrared laser is the most common and popular laser. Therefore, the objective of the present invention is to realize fabrication of a microstructure on the glass by using infrared nanosecond laser.

In some embodiments, the wavelength of the infrared nanosecond laser is 1064 nm, and laser processing parameters include an average laser power of 2 W-10 W, a pulse frequency of 20-200 kHz, and a scanning speed of 1000-2000 mm/min, improving the processing efficiency and the processing precision.

Thickness affects the absorption rate of the laser. If the titanium oxide coating is too thick, most of the laser energy is absorbed by the coating, and the microstructure cannot be formed on the glass surface. Therefore, in some embodiments, the concentration of the titanium oxide nanoparticle hydrogel is 35-40%, and the volume of the titanium oxide nanoparticle hydrogel per unit area of the glass surface is 0.1-0.2 μL/$mm^2$.

When the volume of the 35% titanium oxide nanoparticle hydrogel used for a 40 mm×20 mm glass sheet is 30 μL, a better effect is achieved.

In some embodiments, the horizontal standing time is 5-10 min to allow the titanium oxide nanoparticle hydrogel to fully solidify.

In some embodiments, specific steps of the after-treatment are: ultrasonically cleaning the glass sample with acetone, absolute ethanol and deionized water respectively to remove titanium oxide nanoparticles attached to the surface.

The present invention further provides a glass sample with the microstructure prepared by any of the above methods.

The present invention has the following beneficial effects:
  (1) The titanium oxide nanoparticles are non-toxic, strong in adhesion, and good in opacity, whiteness and brightness.

(2) The absorption rate of the infrared nanosecond laser at the interface between the titanium oxide nanoparticle coating and the glass substrate is increased, and high-efficiency and low-cost fabrication of the microstructure is realized.

(3) The operation method of the present application is simple, low in cost, universal, and easy for large-scale production.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

Figure 1:
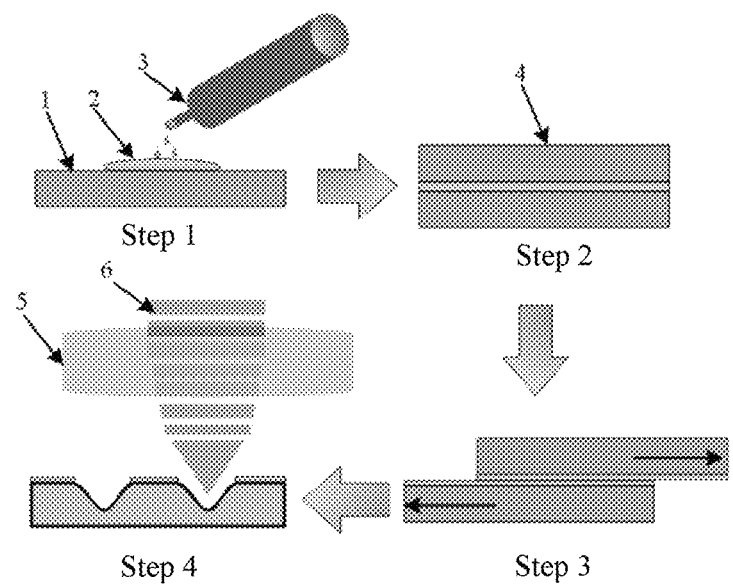
FIG. 1 is a schematic diagram of the method for preparing a microstructure on the surface of glass by titanium oxide nanoparticle-assisted infrared nanosecond laser of Embodiment 1 of the present invention.

1. 40 mm×20 mm quartz glass sample 1; 2. 35% titanium oxide nanoparticle hydrogel in mass fraction; 3. Pipette; 4. 40 mm×20 mm quartz glass sample 2; 5. Infrared nanosecond laser pulse; and 6. Focusing mirror used by laser.

DETAILED DESCRIPTION

It should be noted that, the following detailed descriptions are exemplary, and are intended to provide a further description to this application. Unless otherwise specified, all technical and scientific terms used herein have the same meaning as commonly understood by those of ordinary skill in the art to which this application belongs.

It should be noted that terms used herein are only for the purpose of describing specific implementations and are not intended to limit the exemplary implementations of this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As described in the related art section, in view of the problems that the current commonly used excimer lasers in glass processing have low processing efficiency and high cost, quartz glass has a very low absorption rate for the 1064 nm infrared nanosecond laser, and material removal cannot be realized, the present invention provides a method for preparing a microstructure on the surface of glass by titanium oxide nanoparticle-assisted infrared nanosecond laser, comprising the following steps:

step (1): dropwise applying a titanium oxide nanoparticle hydrogel onto the surface of a glass sample;

step (2): pressing another piece of glass on the surface of the hydrogel, so that the hydrogel is evenly distributed between the two pieces of glass, and then allowing the two pieces of glass to stand horizontally for a period of time until the titanium oxide nanoparticle hydrogel is air-dried;

step (3): separating the two pieces of glass to obtain a glass with a uniform titanium oxide nanoparticle coating;

step (4): forming a microstructure using an infrared nanosecond laser with a wavelength of 1064 nm; and step (5): performing after-treatment, specifically, ultrasonically cleaning the sample obtained in step 3 with acetone, absolute ethanol and deionized water respectively for 10 min to remove titanium oxide nanoparticles attached to the surface, and obtain a glass sample with the microstructure.

Preferably, the volume of the 35% titanium oxide nanoparticle hydrogel used on a 40 mm×20 mm glass sheet in step (1) is 30 μL, and the volume of the titanium oxide nanoparticle hydrogel per unit area of the glass surface is 0.1-0.2 μL/mm$^2$.

Preferably, the standing time in step (2) is 5 min.

The present invention will be further described in detail below in conjunction with specific embodiments. It should be pointed out that the specific embodiments are for explaining rather than limiting the present invention.

Figure 2:
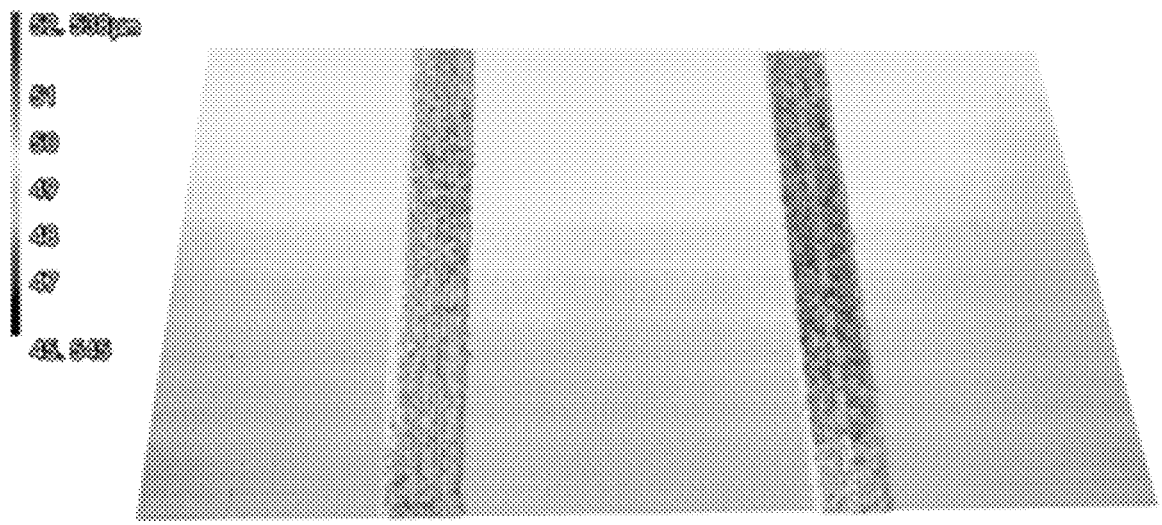
FIG. 2 is a glass microstructure processed by the preparation method of Embodiment 1 of the present invention.
Figure 3:
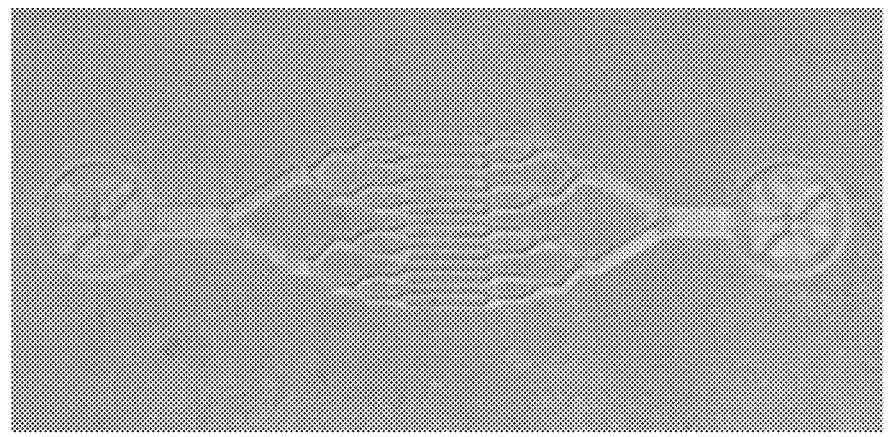
FIG. 3 is a glass microfluidic channel processed by the preparation method of Embodiment 1 of the present invention.

Embodiment 1 step (1): Referring to step 1 in FIG. 1, 30 μL of titanium oxide nanoparticle hydrogel (Alfa Aesar, Titanium (IV) oxide https://www.alfa.com/en/catalog/044517/) with the mass fraction of 35% was dropwise applied to a 40 mm×20 mm glass sample surface, where the volume of the titanium oxide nanoparticle hydrogel per unit area of the glass surface is 0.18 μL/mm$^2$;

step (2): Referring to step 2 in FIG. 1, another piece of 40 mm×20 mm glass was pressed on the surface of the hydrogel, so that the hydrogel was evenly distributed between the two pieces of glass, and then the two pieces of glass were allowed to stand horizontally for 5 min to air-dry the titanium oxide nanoparticle hydrogel;

step (3): Referring to step 3 in FIG. 1, the two pieces of glass were separated to obtain a glass with a uniform titanium oxide nanoparticle coating;

step (4): Referring to step 4 in FIG. 1, a microstructure was processed using an infrared nanosecond laser with a wavelength of 1064 nm, where the parameters of laser ablation are that the average laser power is 5 W, the pulse frequency is 100 kHz, and the scanning speed is 2000 mm/min; and step (5): After-treatment was performed, specifically, the sample obtained in step 3 was ultrasonically cleaned with acetone, absolute ethanol and deionized water respectively for 10 min to remove titanium oxide nanoparticles attached to the surface, and obtain a glass sample with the microstructure. FIG. 2 is a three-dimensional morphology of the final processed microgrooves, FIG. 3 is an overall picture of the final processed microfluidic channels, and FIG. 4 is a partial morphology of the microfluidic channels.

Figure 4:
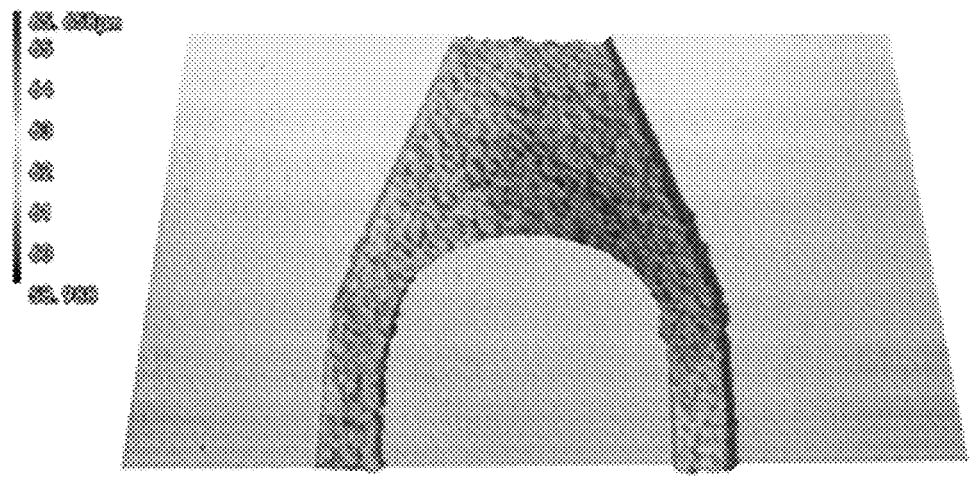
FIG. 4 is a partial morphology of the glass microfluidic channel processed by the preparation method of Embodiment 1 of the present invention.

It can be seen from FIGS. 2 and 4 that there are no cracks on the surfaces of the microgrooves and microfluidic channels, and the processing effect is good.

It should be finally noted that, the foregoing descriptions are merely preferred embodiments of the present invention, but are not intended to limit the present invention. Although the present invention is described in detail with reference to the foregoing embodiments, a person skilled in the art should understand that they may still make modifications to the technical solutions described in the foregoing embodiments or make equivalent replacements to some technical features thereof. Any modification, equivalent replacement, or improvement made within the spirit and principle of the present invention shall fall within the protection scope of the present invention. The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A method for preparing a microstructure on a surface of glass by titanium oxide nanoparticle-assisted infrared nanosecond laser, comprising:

dropwise applying a titanium oxide nanoparticle hydrogel onto the surface of a glass sample;

then pressing another piece of glass on the surface of the titanium oxide nanoparticle hydrogel, so that the titanium oxide nanoparticle hydrogel is evenly distributed between the two pieces of glass, and allowing the two pieces of glass to stand horizontally until the titanium oxide nanoparticle hydrogel is solidified;

separating the two pieces of glass to obtain a glass with a uniform titanium oxide nanoparticle coating;

forming a microstructure using laser; and performing after-treatment to obtain a glass sample with the microstructure;

wherein a concentration of the titanium oxide nanoparticle hydrogel is 35-40%;

wherein a volume of the titanium oxide nanoparticle hydrogel per unit area is 0.1-0.2 μL/mm$^2$;

wherein the laser is infrared nanosecond laser, a wavelength of the infrared nanosecond laser is 1064 nm, and laser processing parameters comprise an average laser power of 2 W-10 W, a pulse frequency of 20-200 kHz, and a scanning speed of 1000-2000 mm/min; and wherein the after-treatment includes ultrasonically cleaning the glass sample with acetone, absolute ethanol, and deionized water respectively to remove titanium oxide nanoparticles attached to the surface.

2. The method for preparing a microstructure on the surface of glass by titanium oxide nanoparticle-assisted infrared nanosecond laser according to claim 1, wherein the glass is quartz glass.

3. The method for preparing a microstructure on the surface of glass by titanium oxide nanoparticle-assisted infrared nanosecond laser according to claim 1, wherein the horizontal standing time is 5-10 min.

* * * * *